United States Patent [19]
Brunsch

[11] 3,810,034
[45] May 7, 1974

[54] OPTOELECTRIC SIGNAL COUPLER

[75] Inventor: Günter Brunsch, Munich, Germany

[73] Assignee: Siemens Aktiengesellschaft, Berlin and Munich, Germany

[22] Filed: Aug. 29, 1972

[21] Appl. No.: 284,463

[30] Foreign Application Priority Data
Sept. 1, 1971 Germany............................ 2143792

[52] U.S. Cl................................. 330/59, 328/2
[51] Int. Cl.................................. H03f 17/00
[58] Field of Search............... 330/33, 59; 307/311; 328/2

[56] References Cited
UNITED STATES PATENTS
3,535,532  10/1970  Merryman................... 307/311 UX
3,576,452  4/1971   Smith........................ 330/59 X
2,779,872  1/1957   Patterson................... 330/69 UX Primary Examiner—H. K. Saalbach
Assistant Examiner—James B. Mullins

[57] ABSTRACT

Apparatus is described for transmitting d.c. signals from an input circuit to an output circuit electrically isolated from the input circuit. Optoelectric coupling is used to achieve the isolation. Photodiodes form the output of the optoelectric couplers, and the photodiodes are connected in series, if more than one coupler is used, and are reverse-biased. Each photodiode has an output terminal connected to an input of an operational amplifier. The input terminals of the amplifier are connected across the fixed ends of a potentiometer, and the variable tap is grounded in common with the ground connection of the amplifier. Positive feedback resistances couple the amplifier outputs to its inputs, and these resistances have values such that the output voltage of the amplifier assumes a value corresponding to the input signal received by the optoelectric couplers.

3 Claims, 2 Drawing Figures

OPTOELECTRIC SIGNAL COUPLER

BACKGROUND OF THE INVENTION

The invention relates to apparatus for the transmission of d.c. signals to an output circuit from an input circuit electrically isolated therefrom by means of optoelectric coupling elements.

To transmit d.c. signals having the same or different polarities, particularly telegraphic signals and control characters therefor, made up of pulses and permanent or level setting signals, from an input circuit to an output circuit electrically isolated therefrom it is well known in the art to employ normal or polarized mechanical relays. Relays of these types can amplify the power of incoming d.c pulses prior to their transmission, but, since mechanical relays are very sensitive to external influences, e.g., humidity and dust, they require continuous maintenance. Moreover, the telegraph speed that can be attained with such telegraph relays is restricted to approximately 100 Baud by the mechanical construction of the relays. Within modern transmission and exchange systems operating at considerably higher telegraph speeds, the use of mechanical relays is no longer possible.

To overcome the above difficulties, a commonly used technique is to employ electronic circuit arrangements which simulate or replace such mechanical relays. Thus, a circuit arrangement is shown in West German Display Copy 1,265,189, wherein optoelectric coupling elements are used to transmit d.c. signals from an input circuit to an output circuit electrically isolated therefrom. Basically, d.c. pulses having one or different polarities can be transmitted by means of such coupling elements. However, no fault current at the input end can be signalled using such a circuit arrangement. This becomes particularly important with respect to monitoring the operating ability of the signalling line. For example, in telegraph engineering it is necessary, for reasons of communication reliability, to prevent the transmitting subscriber immediately from transmitting any further in case of a line break, short circuit, or any other disturbance by causing the disconnection of the existing communication. To accomplish this, German Display Copy 1,265,189, likewise, provides in the input circuit of the optoelectric coupling elements a slowly dropping electromechanical relay. This relay, upon the occurrence of a fault current at the input end, for example, caused by a line break, actuates a contact in the output circuit resulting in a clearly definable potential at the output of the optoelectric coupling element.

This known circuit arrangement has, however, the disadvantage that if d.c. signals having different polarities are transmitted, all asymmetries of the incoming d.c. signals are transmitted, as well. Moreover, further assymetries of the d.c. signals are produced by the optoelectric coupling elements. Such asymmetries, which appear in the form of different amplitudes of the positive and negative d.c. pulses and in the form of different transmission transit times of the positive and negative slopes of the d.c. pulse, produce considerable and, therefore, impermissible distortion of the d.c. signals. Consequently, such a circuit arrangement may only be employed for comparatively low transmission speeds. Furthermore, the control circuit illustrated in West German Display Copy 1,265,189 for signalling a fault current at the input end requires a considerable increase in circuitry and components.

It is an object of this invention to provide a circuit arrangement for transmitting electric pulses from an input circuit to an output circuit electrically isolated from the input circuit, wherein transmission distortions are limited to a minimum.

It is another object of the invention to also operate at high telegraph speeds (in the order of magnitude of 20 kilo bauds).

A further object of the invention is to provide apparatus which will enable in a simple manner signalling of the fault current appearing at its input end without the use of additional components.

SUMMARY OF THE INVENTION

The aforementioned and other objects are achieved by this invention by the provision of optoelectric coupling elements having interconnected photo diodes at their outputs. The outputs of the photodiodes, i.e., the outputs of the coupling elements are, respectively, connected with the inputs of an operation amplifier. The two inputs of the operation amplifier, in order to balance the input signals, are, respectively, connected to the fixed ends of a potentiometer, the variable tap of which is grounded in common with the ground connection of the operation amplifier. The two inputs of the operation amplifier are additionally connected to positive feedback resistance which are so dimensioned that the output potential of the operation amplifier assumes the value of the input signal on the optoelectric coupling elements.

A circuit arrangement in accordance with the invention can be employed either with one or two optoelectric coupling elements. The use of only one optoelectric coupling element results in a saving in components, while the use of two optoelectric elements, i.e., one coupling element for each current polarity, results in better signal symmetry conditions.

A particular advantage of the circuit arrangement according to the invention lies in the fact that in order to signal the presence of fault current at the input the two positive feedback resistances of the operation amplifier are simply dimensioned such that a clearly defined potential is applied across the output of the circuit arrangement, in the event that no more current is fed to the input, e.g., as the result of a line break. This can, as well, suitably be achieved by omitting one positive feedback resistor.

BRIEF DESCRIPTION OF THE DRAWINGS

The foregoing and other advantages, features and additional objects of the present invention will become manifest to those skilled in the art upon reference to the detailed description and to the accompanying sheet of drawing in which preferred present embodiments incorporating the principles of the present invention are shown by way of illustrative example.

DETAILED DESCRIPTION OF THE DRAWINGS

Figure 1:
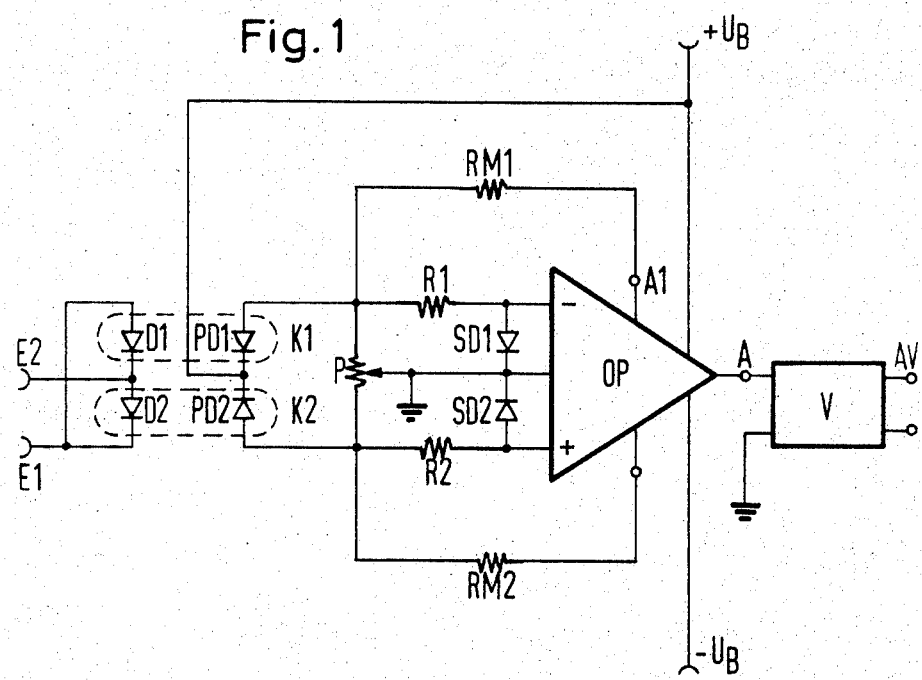
FIG. 1 is a schematic diagram of a first preferred circuit arrangement having two optoelectric coupling elements.

In FIG. 1 is illustrated a circuit constructed according to the invention for the transmission of d.c. signals from an input circuit to an output circuit electrically isolated from the input circuit.

The circuit arrangement shown in FIG. 1 contains two optoelectric coupling elements K1 and K2, an operation amplifier OP connected to the output of the optoelectric coupling elements K1 and K2, as well as a potentiometer P, the fixed ends of which are connected across the outputs of the optoelectric coupling elements and across the two inputs of the operation amplifier OP. The variable tap of the potentiometer is connected to the ground connection of the operation amplifier OP.

The optoelectric coupling elements K1 and K2 which provide for the electric isolation of the input circuit from the output circuit have luminescent diodes D1 and D2 connected at the inputs for the purpose of generating light and photodiodes PD1 and PD2 at the outputs serving as light-operated circuit elements. The luminescent diodes D1 and D2 are so connected that the conductive state of each luminescent diode is responsive to one current polarity applied across the input E1-E2. The photodiodes PD1 and PD2 are interconnected at their negative terminals. and the positive voltage supply +UB of the operation amplifier is applied to that connecting point. Furthermore, the operation amplifier OP has two positive feedback resistances RM1 and RM2 which are, respectively, connected to opposite ends of the potentiometer.

The mode of operation of the circuit arrangement shown in FIG. 1 will now be described. When a current impulse is received at the input E1-E2, which, for example, is of a polarity such that the input E2 is positive with respect to the input E1, then this current impulse brings diode D2 in the conductive and, thus, luminous state. Since the photo diodes PD1 and PD2 are operated by the connection of their negative terminals to the positive voltage supply +UB of the operation amplifier OP in the inverse direction, the reverse resistance of the photodiode PD2 becomes smaller as a result of the lighting of the luminescent diode D2. This necessarily causes a decrease in the voltage drop across the photodiode PDS and, thus, an increase in the positive potential across the positive terminal of photodiode PD2. This, in turn, causes an increase in potential across the positive input of the operation amplifier OP either directly or via the resistance R2. As a result, the positive saturation voltage is adjusted across the output A of the operation amplifier OP, whereby the resistances R2 and R1, as well as the diodes SD1 and SD2 only serve to limit the input current of the operation amplifier.

If a current impulse of opposite polarity is received at the input E1-E2, the diode D1 becomes conductive, resulting, likewise, in the decrease of the reverse resistance of the photodiode PD1, and, thus, in a positive increase of potential across the negative input of the operation amplifier and in the conversion of the output potential of the operation amplifier OP into the negative saturation voltage. Consequently, the transmission of the d.c. pulses from the input E1-E2 to the output A takes place with the same polarity. However, a polarity reversal, if desired, can easily be achieved, for example, by interchanging the input terminals of the operation amplfier.

The two positive feedback resistances RM1 and RM2 are provided so as to maintain the output potential of the operation OP at a value which corresponds to the signal last received at output E1-E2 of the optoelectric coupling elements K1 and K2. The potentials of the two outputs A1 and A2 of the operation amplifier OP, decreased by the voltage drop across the positive feedback resistances, are applied across the input terminals of the operation amplifier OP via the resistances R1 and R2. In operation, there is always a different positive potential across the outputs A1 or A2 of the operation amplifier OP. This different potential depends on the output voltage across the output A of the operation amplifier. For example, by applying a positive saturation voltage across the output A, the potential across the output A2 is comparatively strongly positive, and across the output A1 comparatively weakly positive. Conversely, if a negative saturation voltage appears across output A, the potential across output A1 is relatively strongly positive and relatively weakly positive across output A2. Thus, to reverse the voltage across output A to another polarity, the weakly positive potential at one of the inputs of the operation amplifier OP must be overcome and increased by the output signals of the optoelectric coupling elements K1 or K2. Therefore, there arises an adjustable response threshold for the signal transmission.

The problem of signal distortion during the transmission of d.c. signals is considerable. Those distortions, which limit the transmission speed, may appear in the form of different signal amplitudes and different intervals of the positive and negative signal slopes. Since the optoelectric coupling elements K1 and K2 and the operation amplifier OP influence asymmetrically the d.c. signals to be transmitted, both with respect to the amplitudes and to the transit time between the negative and positive slopes, a potentiometer P is provided between the inputs of the operation amplifier OP, as shown, to overcome this disadvantage. Through this potentiometer P, all the asymmetries of the received input signals, the operating times and the transmission factors of the optoelectric coupling elements, the positive feedback values of the offset currents and the input sensitivity of the operation amplifier OP can simply be adjusted to a minimum. Thus, by employing the potentiometer P, it is possible to balance the input signals of the operation amplifier OP. The balancing with respect to the transit time differences that can be accomplished is expediently oriented toward the switching behavior of the operation amplifier employed. For example, if an operation amplifier is utilized having transit times of several $\mu s$, transit time differences of less than 1 $\mu s$ and, thus, transmission speeds of at least 20 kilobauds can be attained. It is further to be noted that the photodiodes PD1 and PD2 of the coupling elements K1 and K2 are operated with a reverse voltage, so that their small barrier layer capacity and, furthermore, optimum switching conditions can be utilized.

So as to be able to clearly indicate the currentless state of the input circuit E1-E2 at the output of the operation amplifier OP, it is possible to use only one positive feedback resistance, e.g., RM2, so that in this case the positive saturation voltage always appears across the output A of the operation amplifier OP, upon the occurrence of a fault current at the inputs E1-E2.

Since, as a rule, the operation amplifier can only be lightly loaded at the output A, a power amplifier V connected at the output is provided at the output of which a signal with sufficient load capacity is available.

In principle, it is also possible to operate in a modified form specific portions of the circuit arrangement illustrated in FIG. 1. Thus, the photodiodes PD1 and PD2 of the optoelectric coupling elements K1 and K2 can, likewise, be operated in the reverse direction with the aid of the negative voltage supply —UB. In this case, it is necessary to interconnect the photodiodes PD1 and PD2 at their positive terminals. Furthermore, the potentiometer P can be replaced by a correspondingly dimensioned voltage divider having constant resistances, as a result of which, however, the division ratio of the voltage divider can no longer be readily adjusted.

According to a very advantageous further development of the invention, the two optoelectric coupling elements K1 and K2 can be activated separately at the input and the potential of two simultaneous signals can be assessed by a comparison method.

Figure 2:
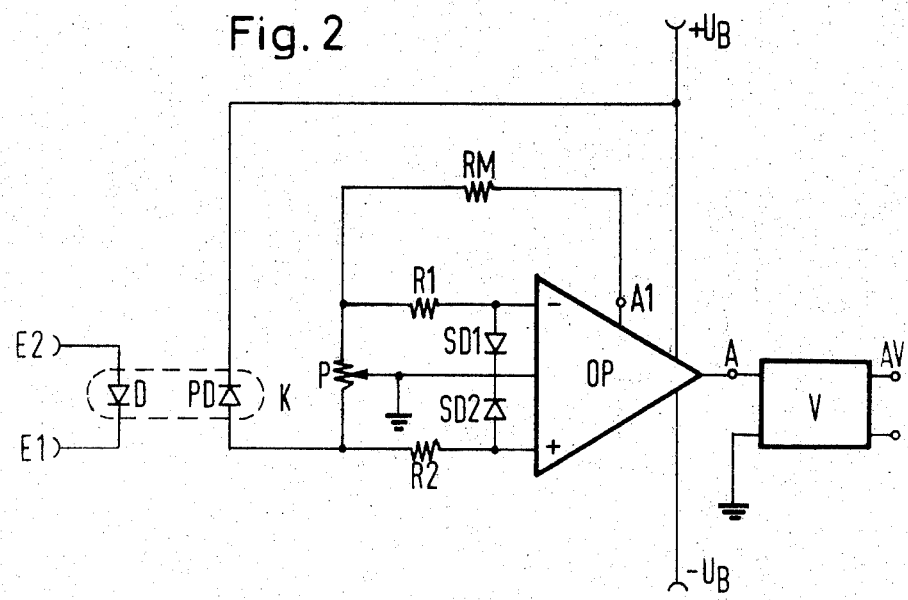
FIG. 2 is a schematic diagram of a second preferred embodiment having one optoelectric coupling element.

FIG. 2 shows a simple circuit arrangement having only one optoelectric coupling element K, which corresponds to the circuit arrangement illustrated in FIG. 1. In this arrangement, only one optoelectric coupling element K and only one positive feedback resistance Rm are used to signal the fault current at the input end. The signal transmission from input circuit E2–E1 to output A of the operation amplifier takes place in such a manner that each of the two signal states is assigned to either the conductive or the blocking state of the diode D. The saving of one optoelectric coupling element, however, is coupled with the disadvantage that the transit time differences between the positive and the negative signal slopes are increased, because the correctly dimensioned reverse current for the input transistors of the operation amplifier is now no longer available over the missing second photodiode. Consequently, this particular circuit having only one optoelectric coupling element is used when no extremely high transmission speeds or a specific input signal is required. This latter circuit may utilize a resistance network consisting of the real resistances employed and dimensioned such that the reverse current of the operation amplifier is immediately available at this input signal voltage.

The principles of the invention have been described herein in terms of alternate preferred embodiments, which are only to be considered as exemplary of these principles. The scope of the invention, within which modifications in or changes to the described embodiments may fall, is defined in the appended claims.

I claim:

1. Apparatus for transmitting d.c. signals from an input circuit to an output circuit electrically isolated from said input circuit, comprising:
   luminescent means for receiving input signals and converting same to light of an intensity corresponding to said input signal values,
   at least one photodiode arranged to receive said light and convert it to corresponding electrical signals,
   voltage means for reverse biasing said photodiode,
   operational amplifier means having an input connected to an output of said photodiode,
   potentiometer means having its fixed terminals connected in parallel with the input terminals of said amplifier and a variable terminal connected in common with a terminal of said amplifier to a reference voltage and
   at least one positive feedback resistance connecting an output of said amplifier to an input of said amplifier, said feedback resistance having a resistance value such that the output voltage of said amplifier will be caused to assume a value corresponding to the value of said input signal.

2. The apparatus defined in claim 1 having two said luminescent means, each of which is responsive to a different polarity of said input signal and having two said photodiodes, each arranged to be response, respectively, to a different one of said two luminescent means, each said photodiode having one terminal connected to said voltage means as to be reverse biased and each said photodiode having the other terminal connected to a different input terminal of said amplifier,
   said fixed terminals of said potentiometer being connected in parallel with said other terminals of said two photodiode.

3. The apparatus defined in claim 2 wherein a said positive feedback resistance is connected to each input of said amplifier.

* * * * *